May 5, 1964 G. A. TINNERMAN 3,131,447
MOUNTING CLAMPS
Filed May 31, 1962 3 Sheets-Sheet 1

INVENTOR
GEORGE A. TINNERMAN
BY: *Fetherstonhaugh & Co*
ATTORNEYS

May 5, 1964  G. A. TINNERMAN  3,131,447
MOUNTING CLAMPS

Filed May 31, 1962  3 Sheets-Sheet 2

INVENTOR
GEORGE A. TINNERMAN
BY: *Fetherstonhaugh & Co*
ATTORNEYS

May 5, 1964
G. A. TINNERMAN
3,131,447
MOUNTING CLAMPS
Filed May 31, 1962
3 Sheets-Sheet 3
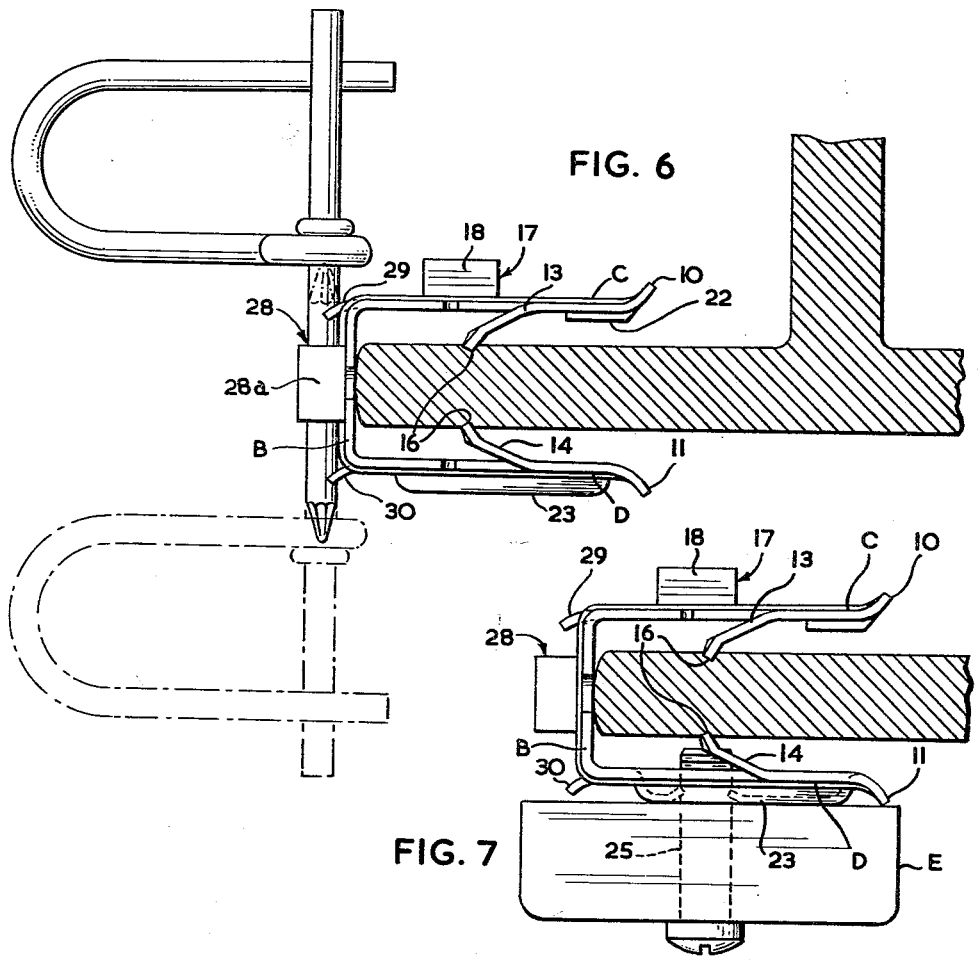
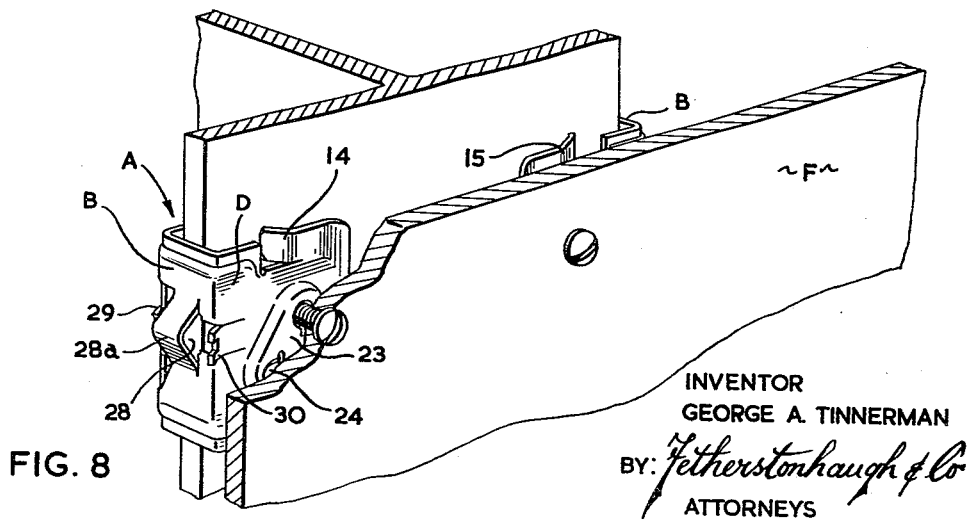
INVENTOR
GEORGE A. TINNERMAN
BY: Featherstonhaugh & Co
ATTORNEYS

United States Patent Office 3,131,447
Patented May 5, 1964

3,131,447
MOUNTING CLAMPS
George A. Tinnerman, 23012 Lake Road,
Bay Village 40, Ohio
Filed May 31, 1962, Ser. No. 198,810
3 Claims. (Cl. 24—81)

This invention relates to sheet metal mounting clamps.

In the construction industry, the attachment and securing of cables (including telephone wires, cables, terminal boxes), conduits, tubing, outlet boxes, terminal panels and such items, particularly to channel beams, flanged beams and other structural elements, has always presented a problem and in the past various types of costly cast metal clamps have been used for the purpose or otherwise securement has been effected generally by drilling, rivetting, threading, welding and like methods. Such methods are costly and time consuming and usually will only serve the purpose of mounting particular items and not provide a mounting versatile in character as to function for the mounting of many types of items.

My invention combines into a single versatile low cost clamp (approximately one-fourth the cost of cast clamps) means for attaching all of the above described devices and many more items for which there have, prior to my invention, been no means for their ready use. It will securely hold to structural building members, threaded screws of different sizes, threaded bridle rings, unthreaded bridle rings, drive rings having shank diameters varying as much as .150 inch to .210 inch, to name just a few.

Furthermore, the single multiple purpose clamp of this invention will securely lock itself on beam, angle or channel flanges varying in thickness from 1/8" to 1/2" (a wider range of thickness can be accommodated by adjustment of dimensions of this clamp). However, the thickness herein mentioned covers virtually all of the sizes of structural members normally used in the building and construction industry.

The invention generally comprises a mounting clamp securable on ledges or like members of varying thicknesses for mounting and securing elements therefrom providing a body formed from sheet metal hardened to provide for a resilient biting grip which includes a preformed sheet bent upon itself to provide a back and a pair of complementary components extending from said back in spaced apart relation to one another and terminating in free ends and forming therebetween a channel for receiving and straddling said member, said components each having tongues struck therefrom and bent towards a complementary tongue of the other component, said tongues terminating in free ends disposed in a direction opposite to those of said components, and bent inwardly substantially to meet the free ends of the complementary tongues of the other component and substantially midway between said spaced components, the free ends of said tongues being adapted to grip the said mounting member securely and to retain said clamp when percussively driven or projected thereon, said tongues spacing said components from the surface of said mounting member, said body having means thereon for receiving and securing independent elements to be positioned adjacent to said mounting ledge.

The invention will be clearly understood by reference to the following detailed specification taken in conjunction with the accompanying drawings.

In the drawings:

FIG. 6 is a side elevation of mounting clamp mounted on the flange of an I-beam which is shown fragmentarily in section and illustrating the alternative mounting of an independent element on the clamp in proximity to the beam, the alternative position of mounting being illustrated in dotted lines.

FIG. 7 is a side elevation of the clamp of the present invention mounted on the flange of an I-beam which is illustrated fragmentarily in section and showing the mounting of a telephone terminal box in proximity to the beam; and FIG. 8 is a perspective illustration of a pair of clamps of the present invention mounted on opposite edges of an I-beam which is illustrated fragmentarily in section as to show the manner in which a panel may be readily mounted in a location of this kind.

Figure 1:
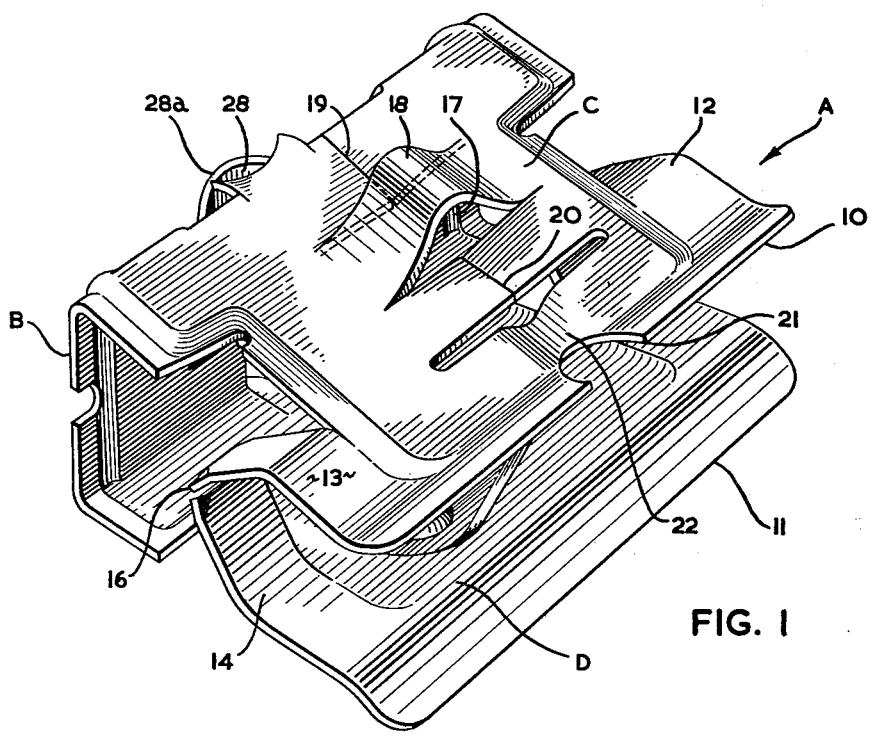
FIG. 1 is a perspective view of the mounting clamp of the present invention.
Figure 2:
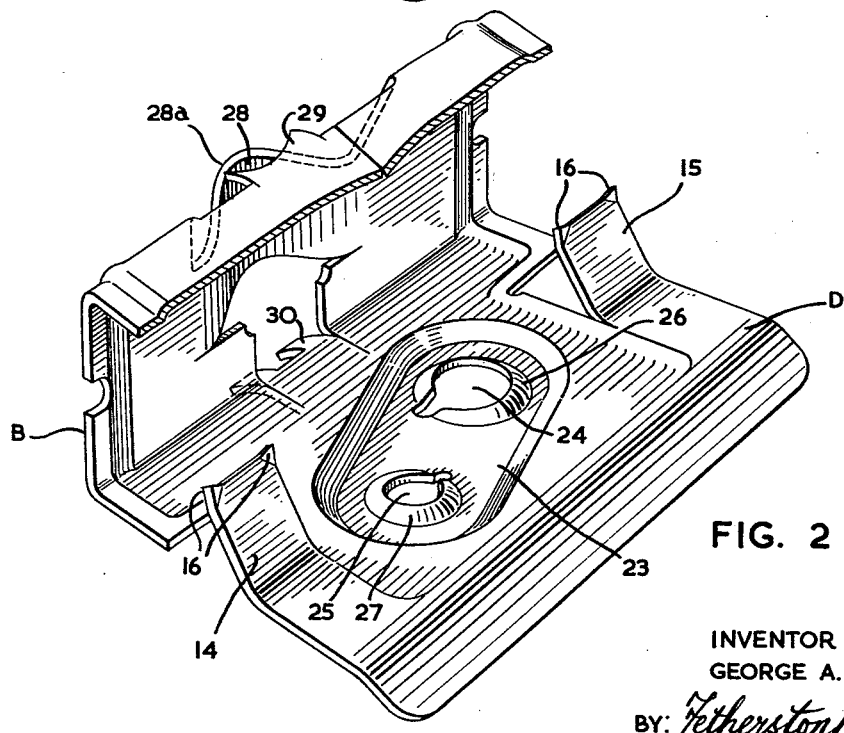
FIG. 2 is a view similar to FIG. 1 but with the top component of the clamp broken away to show more clearly the structural characteristics of other parts of the clamp.
Figure 3:
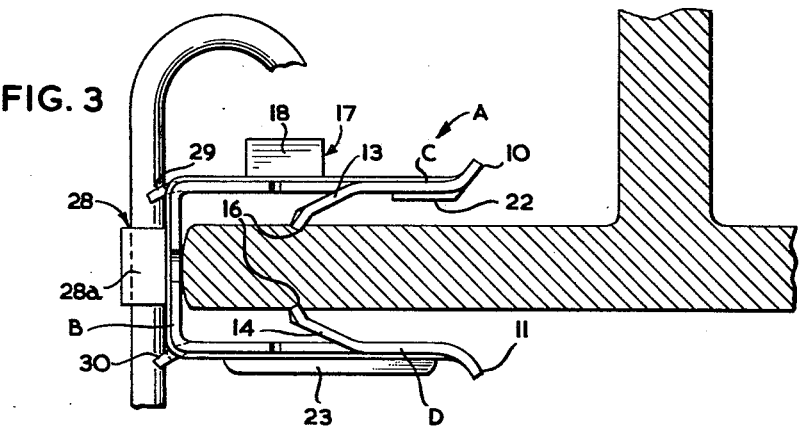
FIG. 3 is a side elevation of the clamp of the present invention shown mounted on the flange of and I-beam which is shown fragmentarily in cross-section and illustrating also the mounting of an independent element on the clamp in proximity to the flange of the beam.

Referring to the drawings and in the first instance to FIGS. 1 and 2, A indicates the clamp as a whole which is formed from sheet metal bent upon itself to provide a back B and two substantially parallel components or arms C and D, respectively. The arms terminate in the free ends 10 and 11 and are preferably flared outwardly from one another as to form guiding means to project the clamp body onto a ledge, flange or other element to which it is to be secured. Basically the arms C and D at their side edges are formed with the complementary tongues 12 and 13, and 14 and 15, which are struck from the marginal edges of the arms terminating in free ends projecting in a direction substantially opposed to the free ends of the arms and bent inwardly substantially to meet the free ends of the corresponding tongues of the opposite arm and substantially at a point midway between said spaced apart arms. Said tongues form a means for gripping the ledge or other mounting member securely when the arms C and D are caused to straddle such ledge when the clamp body is percussively driven or otherwise projected to locate the clamp thereon. The clamp, of course, is hardened to give it strong but resilient characteristics and the free ends of the tongues 12 and 13, and 14 and 15, are designed to engage the mounting member in biting engagement and for which purpose the corners thereof are preferably provided with the offset biting points 16 in each case.

By reason of the fact that the tongues are offset inwardly of the arms and substantially meet about midway between the arms, it will be clear particularly from a consideration of FIGS. 3, 4, 6 and 7 that the arms C and D of the clamp are disposed in spaced substantially parallel relation to the ledge or other member on which the clamp is secured. Preferably, the free ends of the arms 10 and 11 are disposed a little closer to one another than the spacing at the back B so as to provide for a very firm pressure engagement of the tongues 12 and 13, and 14 and 15 with the mounting member and having regard to the fact that the free ends of the tongues are closely disposed to one another and in fact approximately abut, it will be clear that the clamp is capable of being applied to ledges or mounting members within a reasonable range of varying thicknesses. The resilient character of the spring steel body makes it possible for the arms to expand to a substantial degree whereas the even more resilient tongues can also expand to a substantial degree.

Figure 4:
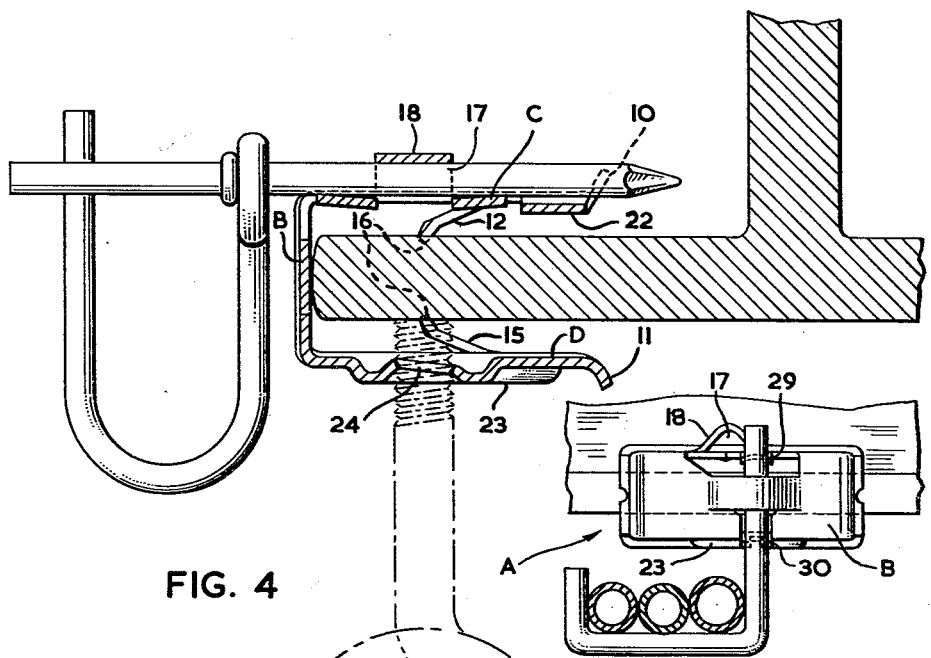
FIG. 4 is a longitudinal section taken through the clamp of the present invention shown mounted on the flange of an I-beam which is illustrated in section and illustrating the mounting of two independent elements from the clamp in proximity to the beam.
Figure 5:
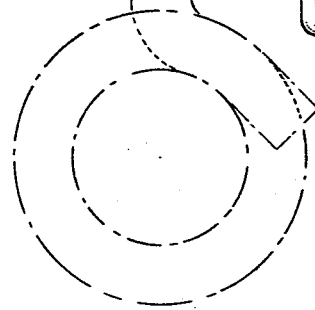
FIG. 5 is a rear elevation of the clamp of the present invention shown mounted on the flange of an I-beam which is illustrated fragmentarily illustrating the securement of an independent element from the clamp in proximity to the beam and its use for supporting a plurality of conduits or tubes.

With the clamp mounted firmly on a mounting member such as a flange, illustrated in FIGS. 3 to 8, it is capable of securing varied elements for the suspension and/or support of accessories of various kinds. It should be noted that the top arm C is slit and formed as to provide for the securement of a rod or shank of a fixture. In this regard, a socket 17 is formed outwardly of the plane of arm C by slitting the arm in spaced parallel relation from which the strip or band 18 therebetween is raised to form socket 17. Likewise and preferably, the arm is slit at 19 and 20 normal to the slits forming the socket 17 to provide a yieldable area on each side of the socket and it should be noted that the size of socket 17 is a minimum size to fit the approximately smallest diameter of shank or rod to be received, whereas larger diameter shanks will also be received and tightly gripped, in which case the metal of arm C on each side of the socket will yield downwardly to provide for reception of the larger diameter and the firm gripping thereof. Aligned with socket 17 at the forward end of the arm is a notch 21, whereas rearwardly of the notch the arm is slightly downwardly bowed as at 22 so that a shank projected into the socket from the rear of the clamp, as illustrated in FIG. 4, will not only be firmly secured by the socket but the forward end of the shank will be held by the edges of notch 21, thus to stabilize the shank against any tendency towards lateral movement under stress or strain of any kind.

The lower arm D is preferably formed with an outwardly directed depression 23 and provided within this area with two orifices 24 and 25, the edges of which are belled inwardly as at 26 and 27, respectively, and notched to provide a thread engaging or thread forming edge surrounding the orifice whereby threaded studs or shanks of varying diameters may be received and secured as illustrated both in FIGS. 4 and 7. In this regard, the spacing maintained by the tongues 12 and 13, and 14 and 15 between the inner surface of arm C and the lower surface of the flange or mounting member to which the clamp is applied will permit the screw threaded shank to pass through and be secured rigidly, the securement being stabilized to some extent if desired by causing the shank to engage the lower surface of the mounting member, as shown in FIG. 4.

Finally, the back B of the clamp is provided with a socket 28 by forming and projecting a portion 28a thereof outwardly, whereas a portion of the metal of the clamp at the juncture of the back A with arms C and D is projected slightly outwardly of the plane of the back and in alignment with and substantially normal to the axial centre of the socket 28 to provide the lugs 29 and 30. These lugs are bent slightly, in the same direction, from the plane of the arms from which they project whereas the free terminal edges thereof are preferably recessed to provide guiding and biting edges which will engage a shank or rod which is projected therethrough and which may be achieved in either direction as illustrated in FIG. 6. This likewise provides for the very firm gripping of shanks projected therethrough and which may be within a reasonable range of varying diameters as the lugs 29 and 30 will resiliently yield under the percussive projection of a shank into the socket 28.

The clamp may be applied to a flange or other mounting member selectively to dispose the arm C on one side thereof and the arm D on the other side thereof, or vice versa, and will perform its gripping and securing function regardless as to whether it is a horizontal mounting member, vertical mounting member or the like. It is shown applied to horizontal mounting members in FIGS. 3 to 7 and to a vertically disposed mounting member in FIG. 8.

Some illustrations of the versatility afforded by the mounting clip is shown in FIGS. 3 to 8. In FIGS. 3, 4, 5 and 6, the mounting of various cable, tube and conduit supports is illustrated. In FIG. 7, its facility in mounting a telephone terminal block E is illustrated; whereas in FIG. 8, the ease of mounting panels such as F is a further example of the versatility of the clamp. Obviously, many other articles may be mounted and supported thereby.

It is obvious that the clamp of the present invention can be manufactured very readily and is subject of production quickly by automation resulting in a product of very low cost, as well as a strong product which may be additionally strengthened by suitable ribbing, as shown, and which is adapted to support any reasonable load required without being dislodged. Moreover, its quick application to a mounting member and the very quick attachment thereto of necessary accessories for the supporting function required is clearly evident. Consequently, the clamp of the present invention provides an economic, easily installed element which eliminates difficulties of the past both in cost and application of cast clamps and other cumbersome elements and which have been more the rule than the exception.

What I claim as my invention is:

1. A mounting clamp securable to flanges or other mounting members of varying thicknesses and for mounting and securing elements therefrom comprising a sheet metal body having hardened and resilient characteristics bent upon itself to provide a back and a pair of complementary arms projecting therefrom in substantially parallel spaced apart relation to one another and terminating in free ends, said arms forming therebetween a channel for receiving said mounting member when said arms are caused to straddle the latter, said arms each having a pair of tongues struck therefrom adjacent their side margins, said tongues terminating free ends projecting in a direction opposite to the free terminal ends of said arms, each tongue being bent substantially to meet the free end of its complementary tongue of the other arm substantially midway between said spaced arms, the free ends of said tongues being adapted to grip said mounting member under substantial pressure and securely retain said clamp thereon when said arms are caused to straddle said mounting member, and means on said clamp for receiving and securing elements to be supported from said mounting member, one of said arms having a band struck therefrom to form a socket beyond its outer plane for receiving and securing a shank of an element to be supported from said mounting member and to locate said mounting member projecting from said clamp normal to said back, said socket carrying arm being weakened yieldably adjacent to said socket and substantially in alignment with the axis of said socket to adapt the latter for the reception and securement of shanks of different thicknesses.

2. A mounting clamp securable to flanges or other mounting members of varying thicknesses and for mounting and securing elements therefrom comprising a sheet metal body having hardened and resilient characteristics bent upon itself to provide a back and a pair of complementary arms projecting therefrom in substantially parallel spaced apart relation to one another and terminating in free ends, said arms forming therebetween a channel for receiving said mounting member when said arms are caused to straddle the latter, said arms each having a pair of tongues struck therefrom adjacent their side margins, said tongues terminating in free ends projecting in a direction opposite to the free terminal ends of said arms, each tongue being bent substantially to meet the free end of its complementary tongue of the other arm substantially midway between said spaced arms, the free ends of said tongues being adapted to grip said mounting member under substantial pressure and securely retain said clamp thereon when said arms are caused to straddle said mounting member, and means on said clamp for receiving and securing elements to be supported from said mounting member, one of said arms having a band struck therefrom to form a socket beyond its outer plane for receiving and securing a shank of an element to be supported from said mounting member and to locate said mounting member projecting from said clamp normal to said back, the terminal edge of said socket carrying arm being notched in alignment with the axis of said socket to receive one end of and stabilize the securement of a shank received in said socket.

3. A mounting clamp securable to flanges or other mounting members of varying thicknesses and for mounting and securing elements therefrom comprising a sheet metal body having hardened and resilient characteristics bent upon itself to provide a back and a pair of complementary arms projecting therefrom in substantially parallel spaced apart relation to one another and terminating in free ends, said arms forming therebetween a channel for receiving said mounting member when said arms are caused to straddle the latter, said arms each having a pair of tongues struck therefrom adjacent their side margins, said tongues terminating in free ends projecting in a direction opposite to the free terminal ends of said arms, each tongue being bent substantially to meet the free end of its complementary tongue of the other arm substantially midway between said spaced arms, the free ends of said tongues being adapted to grip said mounting member under substantial pressure and securely retain said clamp thereon when said arms are caused to straddle said mounting member, and means on said clamp for receiving and securing elements to be supported from said mounting member, said back having band struck therefrom to form a socket beyond its outer plane for receiving and securing a shank of an element to be supported from said mounting member and to position said shank to project from said clamp normal to said arms, said clamp being formed with a lug struck therefrom adjacent to the points of juncture between said arms and said back, said lugs terminating in free edges beyond the plane of said back and being aligned with one another and with the axis of said back socket, the terminal edges of said lugs being adapted to engage a shank projected into said back socket on opposite sides thereof, and said lugs being inclined slightly in the same direction from the plane of their respective adjacent arms.

References Cited in the file of this patent

UNITED STATES PATENTS

| 2,115,312 | Lombard | Apr. 26, 1938 |
| 2,837,184 | Fernberg | June 3, 1958 |
| 2,925,916 | Pollock | Feb. 23, 1960 |

FOREIGN PATENTS

| 1,090,528 | Germany | Oct. 6, 1960 |